United States Patent
Lutz et al.

(10) Patent No.: US 9,949,154 B2
(45) Date of Patent: Apr. 17, 2018

(54) TEST SYSTEM AND METHOD FOR TESTING MULTIPLE DEVICES UNDER TEST SIMULTANEOUSLY

(71) Applicant: Rohde & Schwarz GmbH & Co. KG, Munich (DE)

(72) Inventors: Thomas Lutz, Munich (DE); Jens Volkmann, Birnbach (DE); Franz Obermayr, Kirchdorf an der Amper (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 7 days.

(21) Appl. No.: 14/954,911

(22) Filed: Nov. 30, 2015

(65) Prior Publication Data

US 2017/0094540 A1    Mar. 30, 2017

Related U.S. Application Data

(60) Provisional application No. 62/235,312, filed on Sep. 30, 2015.

(51) Int. Cl.

| | |
|---|---|
| *H04L 1/00* | (2006.01) |
| *H04W 24/08* | (2009.01) |
| *H04W 56/00* | (2009.01) |
| *H04W 76/04* | (2009.01) |
| *H04B 17/18* | (2015.01) |
| *H04W 84/12* | (2009.01) |
| *H04W 88/02* | (2009.01) |
| *H04W 88/08* | (2009.01) |

(52) U.S. Cl.
CPC ............ *H04W 24/08* (2013.01); *H04B 17/18* (2015.01); *H04W 56/001* (2013.01); *H04W 76/04* (2013.01); *H04W 84/12* (2013.01); *H04W 88/02* (2013.01); *H04W 88/08* (2013.01)

(58) Field of Classification Search
CPC combination set(s) only.
See application file for complete search history.

(56) References Cited

U.S. PATENT DOCUMENTS

| | | | |
|---|---|---|---|
| 8,351,863 B2 * | 1/2013 | Holzmann | H04B 17/318 324/520 |
| 2008/0077350 A1 * | 3/2008 | Reichert | G01R 31/319 702/125 |
| 2008/0133168 A1 * | 6/2008 | Barrett | G01R 31/016 702/121 |
| 2009/0209249 A1 | 8/2009 | Plaumann et al. | |
| 2012/0122406 A1 * | 5/2012 | Gregg | H04L 12/2697 455/67.11 |

(Continued)

FOREIGN PATENT DOCUMENTS

| | | |
|---|---|---|
| EP | 2605027 A2 | 6/2013 |
| WO | WO2006034843 A1 | 4/2006 |

*Primary Examiner* — Frank Duong
(74) *Attorney, Agent, or Firm* — Potomac Technology Law, LLC

(57) ABSTRACT

A test system for testing a plurality of devices under test (DUTs) is provided. The test system comprises a test signal generator configured to generate test signals to be transmitted to the DUTs, wherein the test signals comprise at least one synchronization signal. The test signal generator is configured to broadcast the at least one synchronization signal to the DUTs. It is thereby possible to simultaneously test more than one DUT.

18 Claims, 6 Drawing Sheets

(56) References Cited

U.S. PATENT DOCUMENTS

2013/0250781 A1* 9/2013 Gilmartin .............. H04L 43/50
   370/250
2015/0025818 A1* 1/2015 Das ..................... H04W 24/10
   702/58

* cited by examiner

RESULT MESSAGE: Results of Test Step 1 | Results of Test Step 2 | Results of Test Step 3 | ... | Results of Test Step N

FIG. 4

TEST SYSTEM AND METHOD FOR TESTING MULTIPLE DEVICES UNDER TEST SIMULTANEOUSLY

RELATED APPLICATIONS

This application claims the benefit under 35 U.S.C. § 119(e) of the filing date of U.S. Provisional Patent Application Ser. No. 62/235,312 (filed Sep. 30, 2015), the entirety of which is incorporated herein by reference.

FIELD

The invention relates to a test system and a method, which allow for a testing of a plurality of devices under test (DUTs) at the same time, including the testing of communication devices, such as mobile telephones, base stations, and the like.

BACKGROUND

In recent years, in the field of testing devices, especially communications devices, a high throughput and a high testing accuracy have been targeted. When performing a test of a device under test (DUT), it is first of all necessary to configure the device, so that it is ready for testing. Since this configuration requires a certain time, and especially, since this time is not always fixed, but can depend upon the individual DUT, it was necessary to wait, mostly longer than necessary, before beginning the testing, in order to make sure that the DUT is ready.

The patent application publication EP1794907B1 describes a testing system and method, which allow for a significant reduction in this set-up time since there, the DUT triggers the beginning of the measurement as soon as the configuration is complete.

Although this approach reduces the necessary time for testing a signal DUT, a significant increase in throughput cannot be reached. Especially, this approach cannot be used when testing more than one device simultaneously.

What is needed, therefore, is a test system and testing approach that reduces the required time for testing devices (e.g., communications devices), while facilitating the testing of multiple devices simultaneously.

SUMMARY

Example embodiments of the present invention advantageously address the foregoing requirements and needs, as well as others, by providing a test system(s) and associated testing approaches that reduces the required time for testing devices (e.g., communications devices), while facilitating the testing of multiple devices simultaneously.

In accordance with example embodiments, a test system is provided for testing a plurality of devices under test (DUTs). The test system comprises a test signal generator configured to generate test signals to be transmitted to the DUTs, wherein the test signals comprise at least one synchronization signal. The test signal generator is configured to broadcast the at least one synchronization signal to the DUTs. It is thereby possible to simultaneously test more than one DUT, and a significant increase in testing throughput can thereby be reached. By way of example, the synchronization signal comprises one or more of at least one rising edge power signal and at least one falling edge power signal. By way of further example, the synchronization signal comprises a predefined power signal pattern consisting of several rising edge power signals and several falling edge power signals. With such examples, an efficient generation of the synchronization signal is thereby possible.

By way of further example, the rising edge power signal(s) and the falling edge power signal(s) respectively have rise times and fall times of 1%-10% of a frame duration of the test signal. A synchronization of improved accuracy is thereby possible.

By way of further example, the synchronization signal comprises a mobile communication standard defined message frame of a predefined length, wherein the predefined length is of a same time duration as a configuration time duration necessary for configuring the DUTs. A testing procedure of improved time-efficiency can thereby be achieved.

By way of further example, the synchronization signal is of a one of the following signal types: a wireless local area network (WLAN) signal, a universal serial bus (USB) signal, a Bluetooth signal, an Ethernet signal, at least one temperature change, at least one light pulse, at least one magnetic pulse, at least one orientation change of one or more of the DUTs, at least one air pressure change, a trigger voltage targeted at a trigger pin on a circuit board of the device under test. A greatly improved flexibility in generating the synchronization signal is thereby achieved.

According to a further embodiment, the test signals further comprise at least one configuration message, wherein the test signal generator is configured to transmit the at least one configuration message to the DUTs, and wherein the at least one configuration message is adapted to configure each DUT to perform a plurality of test steps. By configuring two or more test steps to be performed successively, an overall increase in testing efficiency can be achieved, since only after completing all configured test steps, results are transmitted.

According to a further embodiment, the test system further comprises a signal analyzer configured to receive at least one respective result message from each DUT. It is thereby possible to analyze signals generated by the DUTs, and thus achieve an increase in testing flexibility. By way of example, each result message comprises one of at least one measuring result generated by a respective DUT and at least one signal generated by the respective DUT, and wherein, when one result message comprises signal(s) generated by the respective DUT, the signal analyzer is configured to determine measuring results based on the signal(s). It is thereby possible to either receive measuring results already processed by the devices under test and also to receive signals generated by the devices under test and process them using the test system, and thus achieve further testing flexibility. By way of further example, the at least one configuration message is further adapted to instruct each DUT to collect a plurality of results from the plurality of test steps, and to collectively transmit the results to the signal analyzer in a single result message. A further increase in testing efficiency can thereby be achieved. By way of further example, the at least one configuration message is adapted to instruct the DUTs to send their result messages successively. It is thereby possible to use a signal analyzer having only a single channel to successively receive the result messages of all devices under test.

According to a further embodiment, the test system further comprises a switch extender coupled to the test signal generator and to the signal analyzer, wherein the switch extender is configured to connect the test signal generator and the signal analyzer to the DUTs. An efficient hardware set-up having only a single channel test signal generator and a single channel signal analyzer is thereby possible. By way of example, the switch extender comprises signal splitter coupled to the test signal generator, wherein the signal splitter is configured to split the test signal and to provide it to the DUTs. By way of further example, the switch extender comprises a switch configured to selectively connect the signal analyzer to one of the DUTs at any given point in time. By way of further example, the switch is configured to successively switch the signal analyzer connection from one DUT to another DUT, such that the signal analyzer receives the result message of the respective DUT to which it is connected at one point in time, and successively receives the result message of the respective DUT to which it is connected at a next point in time, and thereby successively receives the result messages of all DUTs.

In accordance with further example embodiments, a method for testing a plurality of devices under test (DUTs) is provided. The method comprises generating test signals to be transmitted to the DUTs, wherein the test signals comprise at least one synchronization signal, and broadcasting the at least one synchronization signal to the DUTs. A test procedure of improved efficiency is thereby achieved. By way of example, the synchronization signal comprises one or more of at least one rising edge power signal and at least one falling edge power signal.

According to a further embodiment, the test signals further comprise at least one configuration message, and the method further comprises transmitting the at least one configuration message to the DUTs, wherein the at least one configuration message is adapted to configure each DUT to perform a plurality of test steps.

According to a further embodiment, the method further comprises receiving at least one respective result message from each DUT. By way of example, each result message comprises one of at least one measuring result generated by a respective DUT and at least one signal generated by the respective DUT, and wherein, when one result message comprises signal(s) generated by the respective DUT, the method further comprises determining measuring results based on the signal(s).

According to a further embodiment, the method further comprises successively switching a connection from one DUT to another DUT, such that the result message of the respective connected DUT at a one point in time is received, and the result message of the respective connected DUT at a next point in time is successively received, and the result messages of all DUTs are successively received.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example only and not by way of any limitation in the figures of the accompanying drawings, in which like reference numerals refer to similar elements and/or functions, and in which:

FIG. 4 shows a diagram of a result message in such test systems according to example embodiments;

DETAILED DESCRIPTION

Novel approaches (e.g., test devices or systems and testing approaches methods) that reduce the required time for testing devices (e.g., communications devices), while facilitating the testing of multiple devices simultaneously, are provided. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
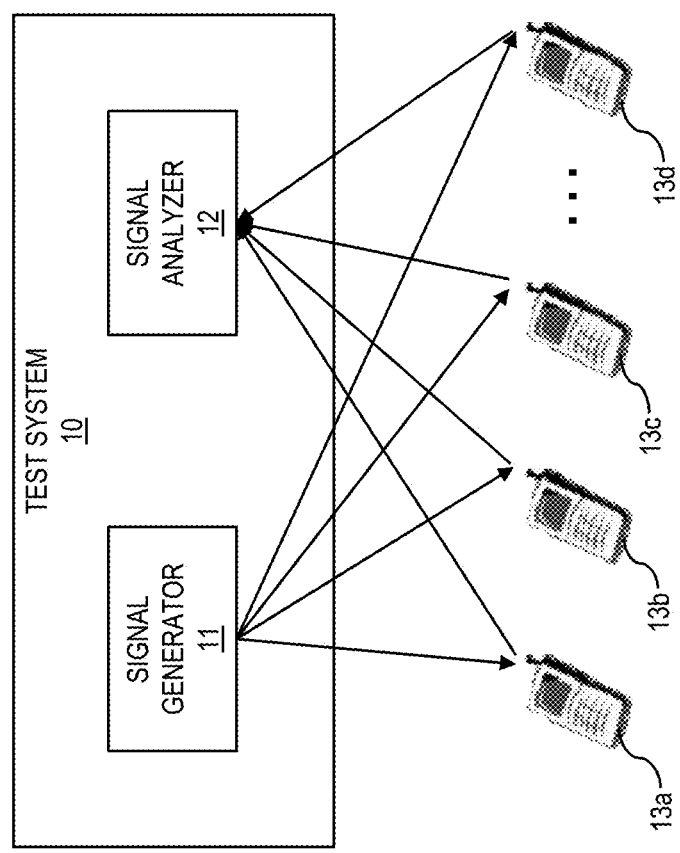
FIG. 1 shows a test system according to example embodiments.

FIG. 1 shows a test system 10 according to example embodiments of the present invention. The test system 10 comprises a test signal generator 11 and a signal analyzer 12. The test signal generator 11 and the signal analyzer 12 are both connected to a number of devices under test 13a-13d. When performing a test, the test signal generator 11 is adapted to send test signals to the devices under test 13a-13d. The signal analyzer 12 is adapted to receive result messages from the devices under test (DUTs) 13a-13d. The detailed function of the test system is further described with reference to FIG. 2.

Figure 2:
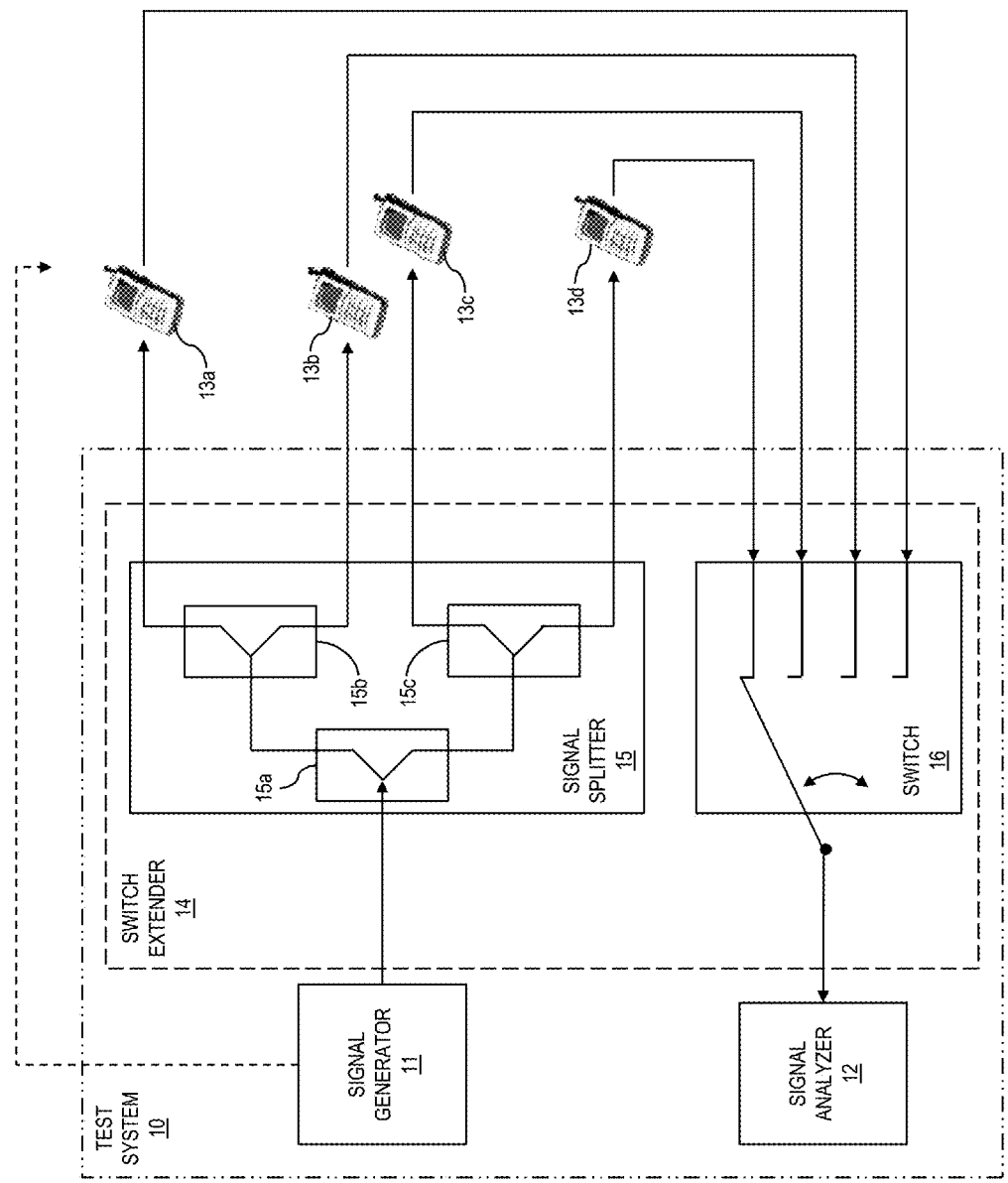
FIG. 2 shows a further test system according to example embodiments.

FIG. 2 shows a further test system 10 according to example embodiments of the present invention. In FIG. 2, an example embodiment of the test system 10 is shown in further detail. In addition to the test signal generator 11 and the signal analyzer 12, the system 10 comprises a switch extender 14, which connects the test signal generator 11 and the signal analyzer 12 to the DUTs 13a-13d.

More specifically, the switch extender 14 comprises signal splitter 15, which connects the test signal generator 11 to the DUTs 13a-13d and a switch 16, which connects the DUTs 13a-13d to the signal analyzer 12. Further, the signal splitter 15 comprises a first signal splitter 15a, which is connected to the test signal generator 11, a second signal splitter 15b, which is connected to an output of the first signal splitter 15a, and a third signal splitter 15c, which is connected to a further output of the first signal splitter 15a. Outputs of the second signal splitter 15b and third signal splitter 15c are connected each to one of the DUTs 13a-13d.

According to example embodiments, for performing a test, the test system 10, via the test signal generator 11, is adapted to generate a configuration message and to transmit the message to the DUTs 13a-13d through the signal splitter 15. In that regard, an identical configuration message is broadcast to the DUTs 13a-13d simultaneously. According to one embodiment, the DUTs 13a-13d are configured in an identical manner. According to an alternate embodiment, the broadcast configuration message is configured to individually assign different configurations, respectively, to the DUTs 13a-13d, for example by using a distinct identifier of the respective DUT.

By way of example, by use of the configuration message, the DUTs 13a-13d are configured to perform a number of tests including a number of test steps—e.g., where the configuration message configures the DUTs 13a-13d to successively perform the tests, to store test results of each individual test, and to transmit the test results to the test system in a result message after completing all test steps. Further, the timing of such result messages may be configured based on the configuration message.

The configuration of the DUTs 13a-13d, however, takes some time. Further, the process of configuring the DUTs 13a-13d might take a different amount of time for each DUT. After sending the configuration message, therefore, the test system waits for a predetermined period of time before the test signal generator 11 transmits the synchronization signal to the DUTs 13a-13d through the signal splitter 15. The synchronization signal synchronizes the DUTs 13a-13d and initiates the test.

Accordingly, after the synchronization signal is sent, the DUTs 13a-13d, depending upon the type of test that is performed, either receive a measuring signal from the test signal generator 11 and process it to generate test results, or directly generate result messages comprising a measuring signal. The result messages are then transmitted by the DUTs 13a-13d to the switch 16. The switch 16 successively switches between the signals transmitted by the DUTs 13a-13d and thereby provides or multiplexes the signals to the signal analyzer 12.

Further, the DUTs 13a-13d may be configured by the configuration message in such a manner that they each transmit their respective result message for a sufficiently long time period, so that the switch 16 is able to multiplex the signals from the DUTs 13a-13d, and the signal analyzer 12 can receive the signals of all DUTs 13a-13d.

By way of example, when providing the synchronization signal to the DUTs 13a-13d through the signal splitter, the synchronization signal comprises at least one rising edge power signal and/or at least one falling edge power signal. Further, a pre-specified power signal pattern comprising one or more rising/falling edge power signals can be used. In this case, a very efficient triggering of the DUTs 13a-13d is possible, since the signal does not have to be decoded in order to recognize the synchronization signal. By way of further example, the rising or falling edge power signal may have a rise time and fall time of 1%-10% of a frame duration of the test signal. By way of further example, a mobile communication standard—e.g., defined message frame of a pre-defined length—can be used as part of the synchronization signal. In this case, the pre-defined length may have a same time duration as a configuration time duration necessary for configuring the DUTs for testing.

As an alternative, instead of providing the synchronization signal through the signal splitter 15 to the DUTs 13a-13d, a separate channel may be used. This is indicated by the dashed line leading from the test signal generator 14 to the DUT 13a-13d. In this case, any type of synchronization signal can be considered. For example, the DUTs 13a-13d can be synchronized by a WLAN-signal or a USB-signal or a BLUETOOTH-signal or an ETHERNET-signal. Also the use of more unconventional signal types is possible. For example, a temperature change registered by a temperature sensor within the DUTs 13a-13d can be employed as synchronization signal. Also, a light pulse received by a light sensor or a camera in the DUTs 13a-13d can be used. Moreover, a magnetic pulse, for example received by a compass within the DUTs 13a-13d can be employed. Also an orientation change of the DUT, for example registered by an attitude sensor within the DUTs 13a-13d, can be used as synchronization signal. Also the use of an air pressure change registered by an air pressure sensor within the DUT 13a-13d is possible. Moreover, a trigger signal can be directly applied to a trigger pin on a circuit board of the DUT.

Figure 3:
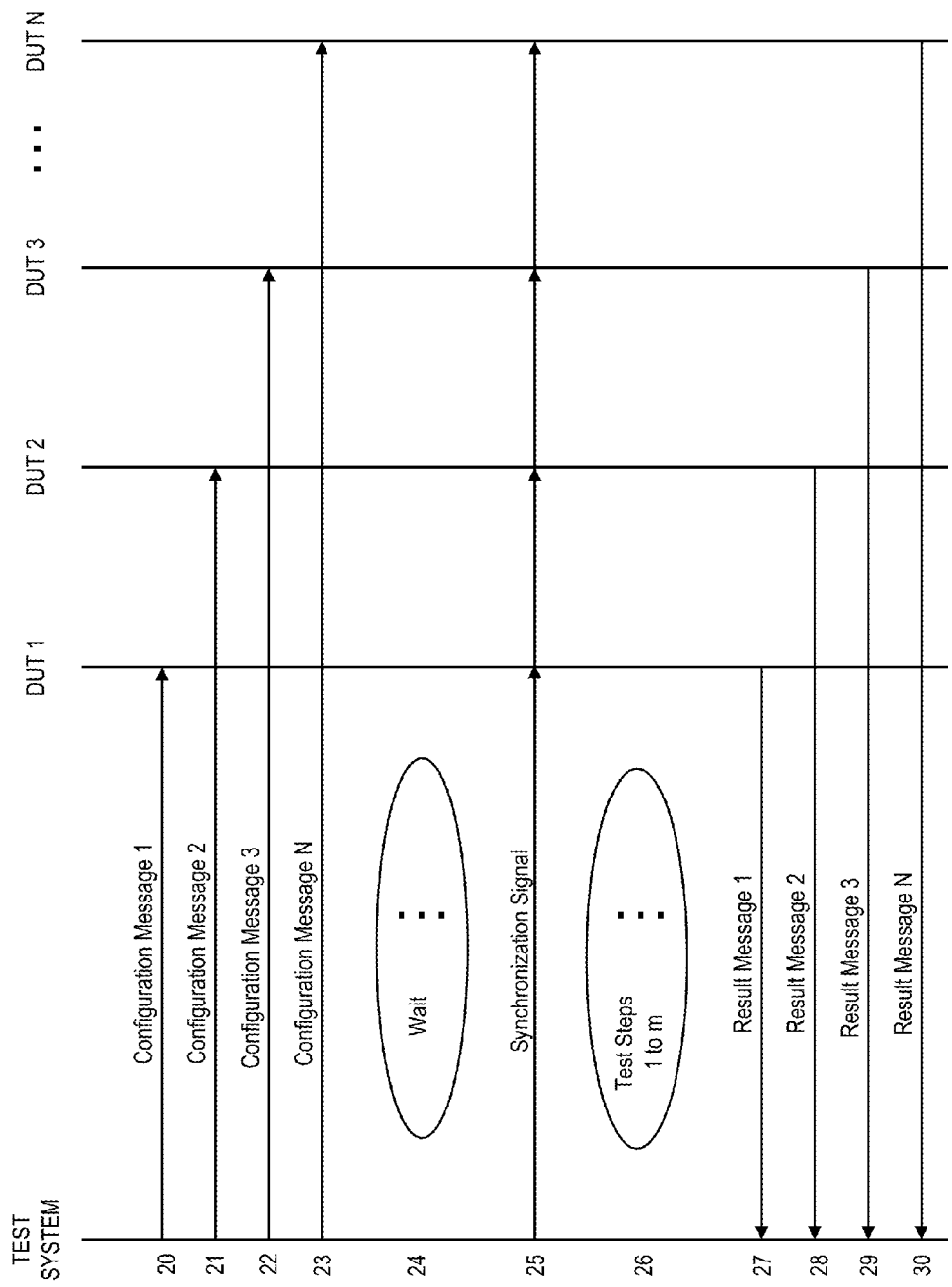
FIG. 3 shows a flow diagram depicting message flows in such test systems according to example embodiments.

FIG. 3 shows a flow diagram depicting message flows in such test systems according to example embodiments of the present invention. First, configuration messages 20-23 (configuration messages 1-N) are transmitted from the test system to a number of DUTs. Here, separate configuration messages 20-23 are displayed. Alternatively, it is also possible to transmit a single configuration message to all DUTs, such as in the case of a broadcast configuration message. After this, in step 24, a waiting period is allowed to pass before a synchronization signal is sent by the test system to the DUTs. Then, in step 25, the synchronization signal is broadcast to the DUTs. In step 26, a number of test steps (1-m) are performed by each DUT. After completing the test steps, each DUT then sends a result message to the test system (Steps 27-30). By way of example, the result messages (1-N) are transmitted sequentially by the DUTs to the Test System. By way of further example, the result messages (1-N) are transmitted simultaneously by the DUTs, and by employing a multiplexing process via the switch 16, the result messages are transformed into a consecutive or serial signal/transmission.

FIG. 4 shows a diagram of a result message (e.g., any of the result messages 1-N of FIG. 3) in such test systems according to example embodiments of the present invention. By way of example, each result message comprises the results of the test steps (e.g., the test steps 1-m of FIG. 3) performed by the respective DUT. This allows for enhanced efficiency of the test procedure, since only after performing a number of test steps, the results are transmitted by the DUTs.

Figure 5:
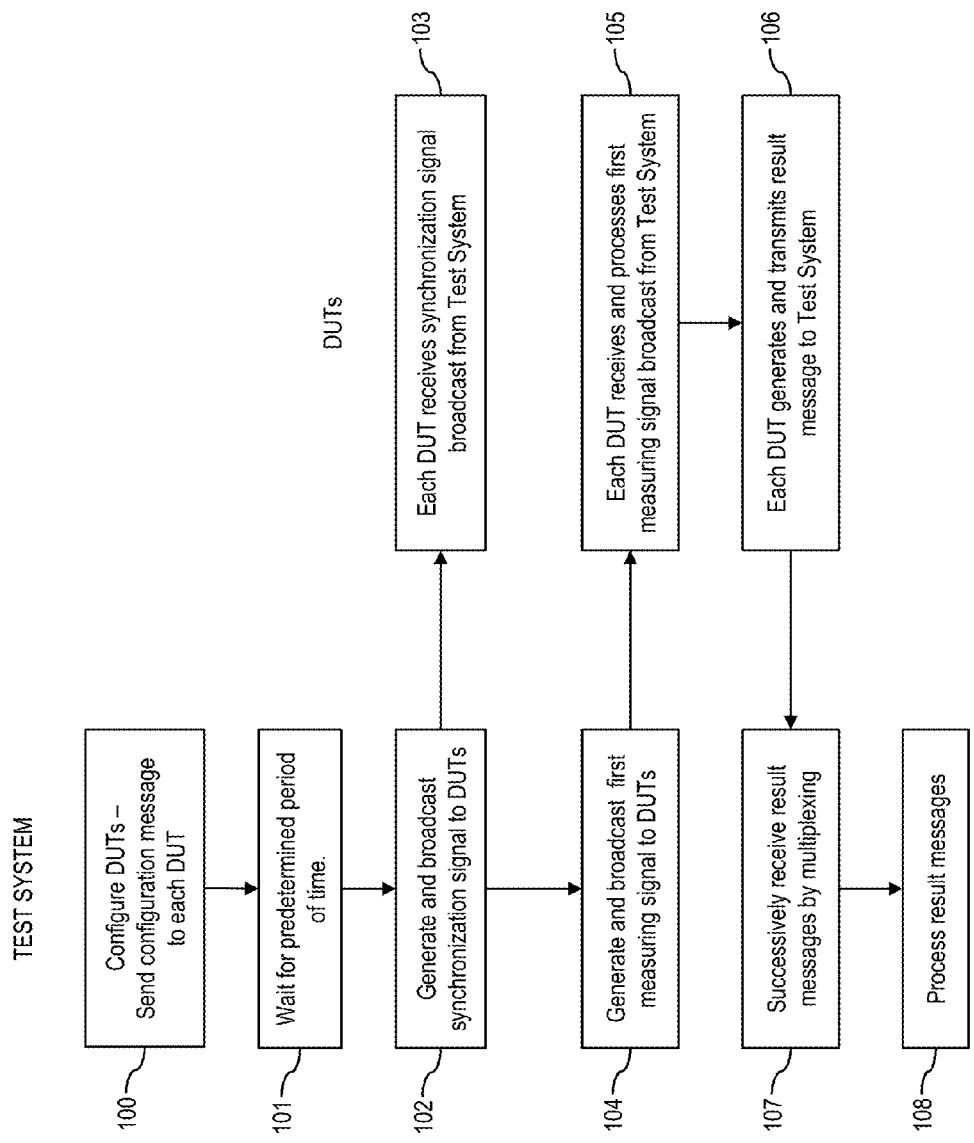
FIG. 5 shows a flow chart depicting a testing approach according to example embodiments.

FIG. 5 shows a flow chart depicting a testing approach according to example embodiments of the present invention. In Step 100, the test system configures the DUTs by sending a configuration message to each DUT. As explained earlier, the configuration message can be broadcast to all DUTs. In Step 101 the test system waits for a pre-determined period of time before sending the synchronization signal. In Step 102, the test system broadcasts a synchronization signal to the DUTs. In Step 103, the DUTs receive the synchronization signal.

In the embodiment of FIG. 5, the reception capabilities of the DUTs are tested. Therefore, in the next Step 104, the test system generates a first measuring signal and broadcasts the measuring signal to the DUTs. In Step 105, each DUT receives and processes first measuring signal broadcast from Test System, which may consist of simultaneous receipt by the DUTs. In Step 106, each DUT generates and transmits a result message to the Test System based upon the processed first measuring signal. In Step 107, the Test System successively receives the result messages, for example, by multiplexing the messages via a switch. In Step 108, the test system processes the received result messages.

Figure 6:
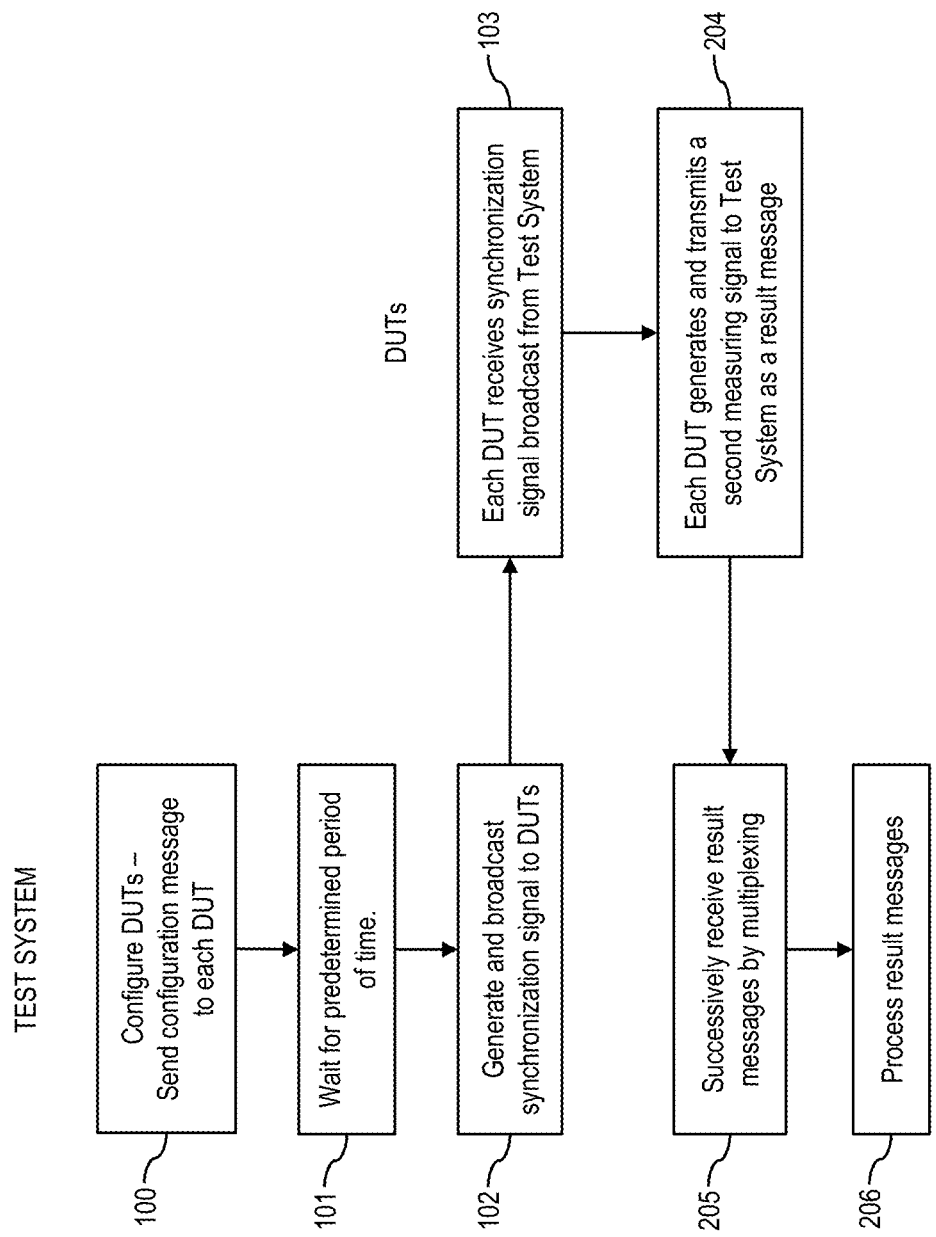
FIG. 6 shows a flow chart depicting a further testing approach according to example embodiments.

FIG. 6 shows a flow chart depicting a further testing approach according to example embodiments of the present invention, where the steps 100-103 are the same as the respective steps of FIG. 5 (the description of which is thus not repeated here).

In this embodiment, the ability of the DUTs to generate a signal is tested. Therefore, after each DUT receives the synchronization signal broadcast by the Test System (Step 103), in Step 204, each DUT generates and transmits a second measuring signal to Test System as a result message, where the generation and transmission of the second measuring signal by the DUTs may be simultaneous. In Step 205, the Test System successively receives the result messages transmitted by the DUTs, for example, by multiplexing the signals. In Step 206, the test system processes the result messages.

While example embodiments of the present invention may provide for various implementations (e.g., including hardware, firmware and/or software components). Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like. Further, all functions may be performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A test system for testing a plurality of devices under test (DUTs), comprising:
   a test signal generator configured to generate test signals to be transmitted to the DUTs, wherein the test signals comprise at least one synchronization signal and at least one configuration message; and
   wherein the test signal generator is configured to broadcast the at least one synchronization signal and the at least one configuration message to the DUTs,
   wherein the at least one configuration message is adapted to configure each DUT to perform a plurality of test steps, and
   wherein the DUTs are configured to synchronize and initiate the plurality of test steps based on the at least one synchronization signal.

2. The test system according to claim 1, wherein the synchronization signal is of a one of the following signal types: a wireless local area network (WLAN) signal, a universal serial bus (USB) signal, a Bluetooth signal, an Ethernet signal, at least one temperature change, at least one light pulse, at least one magnetic pulse, at least one orientation change of one or more of the DUTs, at least one air pressure change, a trigger voltage.

3. The test system according to claim 1, further comprising:
   a signal analyzer configured to receive at least one respective result message from each DUT.

4. The test system according to claim 3, wherein each result message comprises one of at least one measuring result generated by a respective DUT and at least one signal generated by the respective DUT, and wherein, when one result message comprises signal(s) generated by the respective DUT, the signal analyzer is configured to determine measuring results based on the signal(s).

5. The test system according to claim 1, wherein the at least one configuration message is further adapted to instruct each DUT to collect a plurality of results from the plurality of test steps, and to collectively transmit the results to the signal analyzer in a single result message.

6. The test system according to claim 3, further comprising:
   a switch extender coupled to the test signal generator and to the signal analyzer, wherein the switch extender is configured to connect the test signal generator and the signal analyzer to the DUTs.

7. The test system according to claim 6, wherein the switch extender comprises signal splitter coupled to the test signal generator, wherein the signal splitter is configured to split the test signal and to provide it to the DUTs.

8. The test system according to claim 6, wherein the switch extender comprises a switch configured to selectively connect the signal analyzer to one of the DUTs at any given point in time.

9. The test system according to claim 8, wherein the switch is configured to successively switch the signal analyzer connection from one DUT to another DUT, such that the signal analyzer receives the result message of the respective DUT to which it is connected at one point in time, and successively receives the result message of the respective DUT to which it is connected at a next point in time, and thereby successively receives the result messages of all DUTs.

10. The test system according to claim 1, wherein the synchronization signal comprises one or more of at least one rising edge power signal and at least one falling edge power signal.

11. The test system according to claim 10, wherein the synchronization signal comprises a predefined power signal pattern consisting of several rising edge power signals and several falling edge power signals.

12. The test system according to claim 10, wherein the rising edge power signal(s) and the falling edge power signal(s) respectively have rise times and fall times of 1%-10% of a frame duration of the test signal.

13. The test system according to claim 1, wherein the synchronization signal comprises a mobile communication standard defined message frame of a predefined length, wherein the predefined length is of a same time duration as a configuration time duration necessary for configuring the DUTs.

14. A method for testing a plurality of devices under test (DUTs), comprising:
   generating, by a signal generator, test signals to be transmitted to the DUTs, wherein the test signals comprise at least one synchronization signal and at least one configuration message, and wherein the at least one configuration message is adapted to configure each DUT to perform a plurality of test steps; and
   broadcasting, by the signal generator, the at least one synchronization signal and the at least one configuration message to the DUTs; and
   wherein the DUTs are configured to synchronize and initiate the plurality of test steps based on the at least one synchronization signal.

15. The method according to claim 14, further comprising:
  receiving at least one respective result message from each DUT.

16. The method according to claim 15, wherein each result message comprises one of at least one measuring result generated by a respective DUT and at least one signal generated by the respective DUT, and wherein, when one result message comprises signal(s) generated by the respective DUT, the method further comprises:
  determining measuring results based on the signal(s).

17. The method according to claim 15, further comprising:
  successively switching a connection from one DUT to another DUT, such that the result message of the respective connected DUT at a one point in time is received, and the result message of the respective connected DUT at a next point in time is successively received, and the result messages of all DUTs are successively received.

18. The method according to claim 14, wherein the synchronization signal comprises one or more of at least one rising edge power signal and at least one falling edge power signal.

* * * * *